(12) United States Patent
Chen et al.

(10) Patent No.: US 7,195,794 B2
(45) Date of Patent: *Mar. 27, 2007

(54) METHOD OF MAKING AN ELECTROLYTIC CELL

(75) Inventors: Hancun Chen, Williamsville, NY (US); Weitung Wang, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/834,891

(22) Filed: Apr. 30, 2004

(65) Prior Publication Data

US 2005/0244573 A1  Nov. 3, 2005

(51) Int. Cl.
*B05D 5/12* (2006.01)
*H01M 2/14* (2006.01)

(52) U.S. Cl. ............... 427/115; 427/140; 427/180; 29/623.1; 29/623.5; 29/730

(58) Field of Classification Search .......... 427/115, 427/140, 180, 372.2; 29/623.1, 623.5, 730; 429/30, 33, 41, 46
See application file for complete search history.

(56) References Cited

U.S. PATENT DOCUMENTS

| | | | | |
|---|---|---|---|---|
| 4,496,451 A | * | 1/1985 | Ishii et al. | 204/252 |
| 4,530,751 A | * | 7/1985 | Ishiguro | 204/424 |
| 4,990,413 A | * | 2/1991 | Lee et al. | 429/314 |
| 5,085,742 A | * | 2/1992 | Dollard et al. | 205/188 |
| 5,085,754 A | * | 2/1992 | Sagami et al. | 204/296 |
| 5,358,735 A | * | 10/1994 | Kawasaki et al. | 427/115 |
| 5,948,464 A | * | 9/1999 | Delnick | 427/77 |
| 6,451,487 B1 | * | 9/2002 | Besner et al. | 429/304 |
| 6,858,045 B2 | * | 2/2005 | Chen et al. | 29/623.5 |
| 2003/0003237 A1 | * | 1/2003 | Seabaugh et al. | 427/421 |
| 2003/0027033 A1 | * | 2/2003 | Seabaugh et al. | 429/40 |

OTHER PUBLICATIONS

Murray et al., "Electrochemical performance of (La,Sr) (Co,Fe)$O_3$-(Ce,Gd)$O_3$ composite cathodes" (2002). Solid State Ionics 148 (2002), pp. 27-34.

Dusastre et al., "Optimisation of composite cathodes for intermediate temperature SOFC applications" (1999), Solid State Ionics 126 (1999), pp. 163-174.

* cited by examiner

*Primary Examiner*—Brian K. Talbot
(74) *Attorney, Agent, or Firm*—David M. Rosenblum

(57) ABSTRACT

A method of making an electrolytic cell in which an electrolyte layer of an intermediate sintered form is coated with a pre-coat layer containing electrically non-conductive particles of less than about one-tenth of a micron in size to fill in defects existing within the electrolyte layer. The pre-coat layer is removed so that the electrically non-conductive particles remain within the defects of the electrolyte layer. The cathode layer is then applied to the electrolyte layer with the electrically non-conductive particles in place within the defects. The intermediate sintered form is fired with the applied cathode layer to produce the electrolytic cell.

11 Claims, 1 Drawing Sheet

METHOD OF MAKING AN ELECTROLYTIC CELL

FIELD OF THE INVENTION

The present invention relates the method of making an electrolytic cell having anode, cathode and electrolyte layers. More particularly, the present invention relates to such a method in which defects within the electrolyte layer are filled in with electrically non-conductive particles of less than one-tenth of a micron in size before applying a cathode layer to the electrolyte layer.

BACKGROUND OF THE INVENTION

Electrolytic cells generally consist of a layered structure having an anode and a cathode on opposite sides of an electrolyte. Such electrolytic cells can be used in oxygen concentrators and like devices to separate oxygen from an oxygen containing gas, such as air. Alternatively, electrolytic cells form the basis of solid oxide fuel cells. In both such devices, when the electrolyte is subjected to high temperature, it is capable of conducting oxygen ions. The electrolyte is formed of an ionic conducting ceramic material, typically, ytrium stabilized zirconia ("YSZ") or gadolinium doped ceria ("CGO").

In case of an oxygen generator, when an electrical potential is applied across the cathode and the anode and the electrolyte is subjected to high temperature, oxygen ions will be produced at the cathode. The oxygen ions will pass through the electrolyte and recombine at the anode to form molecular oxygen. In a fuel cell, fuel is passed on the anode side to react with the permeated oxygen from the electrolyte at operating temperature. An electric load can be placed across the cathode and anode for production of electrical power.

The electrolyte layer should be thin and defect free while the anode and cathode layers should be porous with minimum polarization resistance. The current procedure for fabricating an electrolytic cell include preparation of a dual-phase anode support layer, deposition of a dense film layer on the anode support to serve as the electrolyte and thereafter, the application of the cathode layer on the electrolyte layer. The porous anode support can be in the form of a disk or tube.

Various techniques have been used for fabrication of the dense, electrolyte film, including atmospheric plasma spraying, colloidal deposition, slurry/co-firing processes and tape isopressing. The slurry/co-firing process can be used to produce a dense electrolyte that has a thickness of about 25 microns. After the electrolyte is sintered, a porous cathode layer can be applied by slurry dipping.

There are two problems with the current manufacturing techniques used in the production of electrolytic cells. First, optimal performance is not produced because the cathode coating tends to have high polarization resistance. For instance, mixtures used in forming the cathode, such as lanthanum, strontium, cobalt, iron oxide ("LSCF") and CGO, have poor pore size distribution and microstructure. This results in a lower triple phase boundary than is otherwise possible. Another problem is that electrolytic cells are prone to shorting after the cathode coating is applied. As a result of the shorting, the cathode layer has partial contacts with the anode layer which creates a short cut for the current path. When the electrolytic cell becomes shorted, it does not function. In fact, manufacturing yields for producing non-shorting electrolytic cells is low, only about 50 percent. The reason for the low productivity is believed to be related to the fact that the electrolyte film is typically thin, about 25 microns and cannot be sintered to 100% of the theoretically density used in currently available technologies. Thus, the electrolyte film contains a certain degree of defects that are of the sub-micron scale.

In typical cathode coating techniques, particularly those that involve application through a slurry solution, the fine particles that are contained within such solution are of the same scale as the defects existing within the electrolytic cell. Such fine particles are able to penetrate the defect and thus establish a short between the cathode and the anode.

As will be discussed, the present invention solves this problem by providing a method to make an electrolytic cell in which defects are filled in before cathode deposition to prevent the cell from shorting.

SUMMARY OF THE INVENTION

A method of making an electrolytic cell in which an electrolyte layer of an intermediate sintered form is coated with a pre-coat layer containing electrically non-conductive particles of less than about one-tenth of a micron in size to fill in the defects existing within the electrolyte layer. The intermediate sintered form comprises the electrolyte layer supported by an anode layer. The pre-coat layer is removed so that the electrically non-conductive particles will remain within the defects of the electrolyte layer. At least a cathode layer is applied to the electrolyte layer with the electrically non-conductive particles in place within the defects. The intermediate sintered form is fired with the at least the cathode layer applied to produce the electrolytic cell. Since the electrically non-conductive particles are located within the defects and are of sub-micron size, the incidence of the cathode material contacting the anode is drastically reduced to allow for increased production.

The pre-coat layer can be applied by dip coating the intermediate sintered form with the slurry containing the electrically non-conductive particles suspended within a solvent. The pre-coat layer can be removed by wiping of the pre-coat layer when wet. Preferably, a concentration of the electrically non-conductive particles within the slurry is no greater than about 60 percent by weight. The concentration of the electrically non-conductive parties within the slurry can be in a range of between about 20 percent and about 60 percent by weight. The solvent can be selected from the group consisting of water, alcohol, isopropanol and toluene. Further, the electrically non-conductive particles are formed from an ionic conducting material making up the electrolyte layer.

The use of the nano-scale particles can be extended to the cathode layer to enhance the regularity of pore size distribution and microstructure. The nano-scale particles are more apt than larger particles to lodge in defects within the electrolyte layer. The use of the pre-coat layer, however, acts to alleviate this problem. As such, in a method of the present invention, the cathode layer can comprise electrically conductive particles of less than about one-tenth of a micron in size. The electrically conductive particles can be a single phase of a metal or metal alloy. Alternatively, the electrically conductive particles can be a two-phase mixture of electronically conductive particles formed from a metal or metal alloy and ionic conducting particles present in an amount that is preferably less than about 50 percent by weight. A further alternative is that the electrically conductive particles are a three-phase mixture of electronically conductive particles formed from a metal or metal alloy, ionic conducting particle and mixed conducting particles. In such case, the electronically conductive particles, the ionic conducting particles and the mixed conducting particles are present within the mixture in ranges of between about 5 percent and about 50 percent by volume, and between about 5 percent and about 45 percent by volume and between about 5 percent and about 90 percent by volume, respectively.

In any embodiment of the present invention, the electronically conductive particles are formed from silver, lead, platinum, palladium or silver.

BRIEF DESCRIPTION OF THE DRAWINGS

While the specification concludes with claims distinctly pointing at the subject matter that applicants regard as their invention, it is believed the invention will be better understood when taken in connection with the accompanied drawings in which:

DETAILED DESCRIPTION

Figure 1:
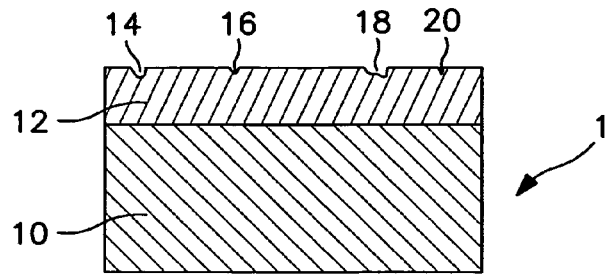
FIG. 1 is a schematic sectional view of the intermediate sintered form in which an electrolyte layer containing defects is supported by an anode layer.

With reference to FIG. 1, an intermediate sintered form 1 is illustrated having a porous anode layer 10 supporting an electrolyte layer 12. Intermediate sintered form 1 can be of any configuration, for instance, a tube or a plate.

Intermediate sintered form 1 is so named because it has been subjected to a forming operation in which an anode layer 10 and an electrolyte layer 12 are sintered and have been shaped to, for instance, a tube. Anode layer 10 in the green state can contain electrically conductive parties or a mixture of electrically conductive particles and ionic conducting parties so that its thermal expansion characteristics match that of the electrolyte layer 12. Additionally anode layer 10 also contains binders and pore forming material. Electrolyte layer 12 while in a green state will contain the ionic conductor and binder material. The anode layer 10 while in a green state can be shaped and thereafter heated to produce a sintered form. The electrolyte layer 12 while in a green state can be applied to the formed anode layer and then heated to burn out binders and to sinter the active material. Alternatively, the anode layer 10 and electrolyte layer 12 can both be formed in a green state and thereafter heated and fired to remove the binder and to produce the intermediate sintered form 1.

Anode layer 10 can be a mixture of about 50 percent by weight of LSCF and about 50 percent by weight of CGO. Electrolyte layer 12 can contain CGO. The sintered intermediate form 1 can also include intermediate layers between anode layer 10 and electrolyte layer 12 and the claims are intended to cover such possibility.

Figure 2:
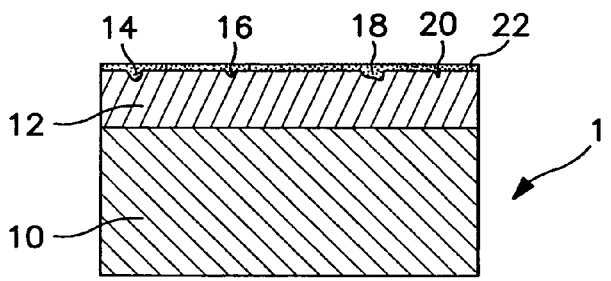
FIG. 2 is a schematic sectional view of the intermediate sintered form of FIG. 1 in which a pre-coat layer is applied to the electrolyte layer in accordance with a method of the present invention.

Intermediate sintered form 1 has defects 14, 16, 18 and 20 which if left untreated will grow into cracks and fissures during subsequent forming operations in which a cathode layer is applied and sintered. With additional reference to FIG. 2, a pre-coat layer 22 is applied to electrolyte layer 12. Pre-coat layer 22 fills the defects 14, 16, 18 and 20 with nanoparticles, that is particles having an average size of less than one-tenth of a micron.

The pre-coat layer 22 can be applied in a slurry coating process. There are no limitations as to the make up of the solvent, provided the same does not react with electrolyte layer 12. Examples of suitable solvents are water, alcohol, isopropanol, and toluene. The solid content of the pre-coat layer should be electrically nonconductive and preferably, the same material used in forming electrolyte layer 12. Other materials can be used provided that such other materials have a compatible thermal coefficient of expansion with the material of electrolyte layer 12. As indicated above, the size of the particles should be of nano-scale, that is less than about one-tenth of a micron.

The percentile concentration of solid load within the slurry used in applying pre-coat layer 22 is in a range of between about 20 percent and about 60 percent by weight. If dip coating techniques are employed, solid load or solid concentration within the slurry should be less than about 60 percent by weight.

Although pre-coat layer 22 is preferably formed by slurry dipping, other types of formation can be used, such as tape isopressing and other isopressing techniques, thermal spraying, and etc. If a slurry coating technique is used, a subatmospheric pressure can be applied to the anode layer 10 on the other side of electrolyte layer 12 to accelerate infiltration.

Figure 3:
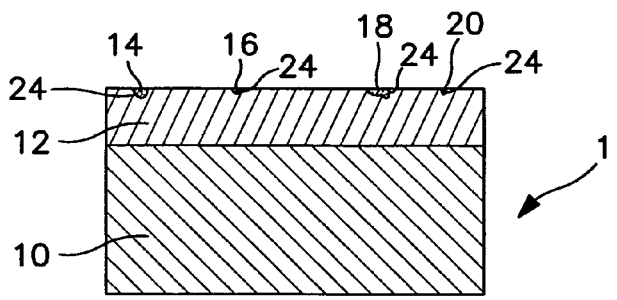
FIG. 3 is a schematic sectional view in which the pre-coat layer, previously applied, is removed from the electrolyte layer leaving particles in place and within defects of the electrolyte layer.

With reference to FIG. 3, after pre-coat layer 22 is formed, it is removed to leave particles 24 located within defects 14, 16, 18 and 20. This can be accomplished simply by wiping the intermediate sintered form with a cloth after application of the pre-coat layer 22 by slurry dipping.

Figure 4:
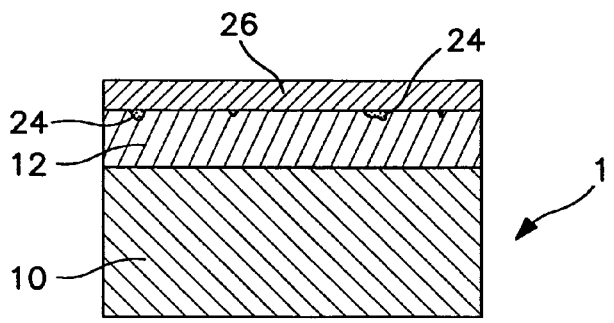
FIG. 4 is a sectional-schematic view of an electrolytic cell that has been prepared in accordance with the method of the present invention.

With reference to FIG. 4, while the particles are embedded within defects 14, 16, 18 and 20, the cathode layer 26 is applied which preferably also contains particles nano-scale. The mixture can be either single-phase, dual-phase, or triple-phase. In applying cathode layer 26, the material used may also contain pore forming materials such as graphite or starch to produce pores after firing. The pore size can typically be in a range of between about 0.01 and about 5 microns. Although pores will be produced by the incomplete contact of particles in a predictable manner without pore formed, if pore formers are used, the pore former should have a pore size roughly three times larger than the desired pore size. The thickness of the cathode layer 26 after firing is in the range of between about 5 and about 150 microns, preferably between about 40 and about 60 microns. The Cathode layer 26 can be formed by slurry dipping or other known technique.

Single-phase materials for cathode layer 26 include silver, lead, platinum, palladium and silver mixtures. A dual-phase can be mixtures of the aforementioned metals with CGO. A triple-phase mixture might, in addition, include an ionic conductor such as YSZ or CGO. The proportions utilized in dual-phase and triple-phase mixture are selected based upon the desired application. Preferably, the ionic conductor in a dual-phase mixture is less than 50 percent by weight and more preferably less than 30 percent by weight. For a triple-phase mixture, the mixed conductor and ionic conductor should be present in an amount at or above the percolation limit for oxygen ion conduction. The mixed conductor and metal or metal alloy electrical conductor should be present in an amount at or above the percolation limit for electronic conduction. In this regard, the mixed conductor can be present at between about five percent and about 90 percent by volume. The metal or metal alloy can be present in an amount at between five percent and about fifty percent by volume. The ionic conductor can be present in an amount of between five percent and about forty-five percent by volume. The particle size as mentioned above should be of nano-scale size in order to obtain benefits of improved pore size distribution and microstructure and therefore, a greater triple phase boundary than in prior art cathodes.

As with intermediate sintered form 1, an intermediate layer can optionally be applied between the cathode layer 26 and the electrolyte layer 12. The use of such intermediate layers allows for closer matches in thermal expansion characteristics between adjacent layers by use of multi-phase mixtures and varying the contents of the constituents thereof.

After an appropriate thickness of the cathode layer 26 is applied, the coated body is then heated and sintered to form the electric cell. The temperature can be from between about 800° C. and about 1,400° C., depending upon the coating materials.

Composite tubes were manufactured in accordance with the present invention. The tubes consisted of a dense CGO film on a porous anode that was made up of LSCF and CGO. In addition, an intermediate layer was applied between the anode and cathode layer. The intermediate layer was formed of about 30 percent by weight LSCF and the remainder CGO. The tubes were then sintered.

In the manufacture of the composite tubes, a powder mixture was prepared by mixing about 50 grams of LSCF having an average particle size of less than about 30 microns with about 50 grams of CGO. The CGO powder used for such purpose also had an average particle size of less than about 30 microns. About 17.5 grams of graphite pore former having an average particle size of less than about 74 microns was also added to the mix. The mixture was placed in a plastic vial with a few methylacrylate mixing balls. The vial was then inserted into an SPEX CERTIPREP MIXER/MILL and mixed for 10 minutes. A polyurethane bag was then placed over a mandril that was roughly about 9.5 millimeters in diameter. The prepared mixture was slowly poured into the bag to the desired volume. The bag and mandrel were vibrated to ensure that mixture fully filled the bag.

The bag was then capped and isostatically pressed at a pressure of about 20,000 psi for about 2 minutes. After isopressing, the bag was removed and the mandrel was withdrawn, leaving a green tube. The green tube was then loaded into a furnace and heated at a rate of about 1° C. per minute in ambient air to about 700° C. for about 2 hours to remove the graphite pore former. The heating ramp was then increased to about 2° C. per minute to about 950° C. This heating took about 4 hours. The furnace was cooled to room temperature at the rate of about 2° C. per minute.

The sintered tube was then coated with the anode interfacial layer by first dipping the tube into a first slurry solution containing about 70 percent by weight CGO and about 30 percent by weight LSCF. This solution had a particle content with an average particle size of about 1.2 microns. The interfacial layer was formed with a thickness of about 15 microns. After the coating was dry, the composite tube was then heated in a furnace at about 1° C. per minute in ambient air to about 700° C. for about 2 hours. The furnace was then cooled to room temperature at a rate of about 2° C. per minute. The tube was then coated with the electrolyte layer by dipping the tube into a second slurry solution containing CGO with an average particle size of about 0.5 microns. The resulting electrolyte layer was formed with a thickness of about 15 microns. The coated tube was then loaded back into the furnace and heated at between at about 1° C. and about 2° C. per minute in ambient air to about 1335° C. After sintering at this temperature for about 4 hours, the furnace was cooled to room temperature at the rate of 2° C. per minute.

The end result was an intermediate sintered form that was used as a base upon which a cathode layer was applied. In the examples listed below, such cathode layer was applied in accordance with the prior art and the present invention.

EXAMPLE 1

In this example, an electrolytic cell was fabricated in accordance with a prior art technique and further, utilized a cathode layer that did not contain a nano-scale microstructure. The cathode was formed on the electrolyte surface (outside surface) of the composite tube by slurry dipping. The slurry used was toluene-based having a solid content of about 40 percent by weight and that in turn consisted of about 90% by weight of LSCF and about 10% by weight of CGO. The CGO and LSCF powder used for the slurry both had a similar particle size of between about 0.4 microns and about 0.7 microns. In preparing the slurry solution, both powders were mixed uniformly with the solvent and an appropriate amount of binder to obtain a viscosity of about 200 centipoise (c. p.).

To form a coating on the outside surface, the composite tube, formed using the manner outlined above, was dipped into the prepared slurry and allowed to soak for a few seconds. The tube was then carefully withdrawn from the slurry and allowed to dry in an oven for between about 5 and about 10 minutes. The dried tube was then loaded into a furnace and heated at a rate of about 1° C. per minute in ambient air to about 450° C. for about 1 hour to remove the organic binder in the coating. The heating ramp was increased to about 2° C. per minute to about 1000° C. for about 1 hour to sinter the coating. The furnace was cooled to room temperature at the rate of about 2° C. per minute. The cathode coating prepared in such manner was found to be porous with a porosity of from between about 30 percent and about 40 percent and with thickness of around 50 microns.

Over twenty such cells were produced and the resultant electrolytic cells were evaluated for ASR (area specific resistance) at a current density of about 1 A./cm$^2$. At about 750° C., an ASR of about 0.5 ohm-cm$^2$ was obtained. The manufacture yield for producing non-shorting electrolytic cell based on room temperature resistance evaluation was from between about 20 percent and about 35 percent.

EXAMPLE 2

In this example, an electrolytic cell was fabricated in accordance with the current invention. Both the pre-coat layer and the cathode functional layer were formed with the use of nano-scale particles. Both layers were formed on the electrolyte surface (outside surface) of the composite tube by slurry dipping. The slurry used for the pre-coat layer was a commercially available ceria colloidal suspension having a particle size of between about 10 and about 20 nm. The suspension was obtained from Alfa Aesar of Ward Hill, Mass., United States of America. The slurry used for the nano cathode functional layer was toluene-based had a solid content of about 40 percent by weight and that in turn consisted of about 90 percent by weight LSCF and about 10 percent by weight of CGO. The LSCF powder used for the slurry has had a particles size of between about 0.4 and about 0.7 µm. The CGO had a nano-scale particle size of less than about 50 nm. The CGO was obtained from SCI Engineered Materials, Columbus, Ohio, United States of America. In preparing this slurry solution, both powders were mixed uniformly with the solvent and an appropriate amount of binder to obtain a viscosity of about 200 centipoise (c. p.).

In forming the coating, the composite tube, formed using the manner outlined above, was first dipped into ceria colloidal suspension for between about 5 and about 10 seconds. The tube was then withdrawn from the suspension. While wet, the CeO2 layer on the surface of the composite tube was wiped off using a soft cloth leaving the ceria particles lodged within the defects within the electrolyte. The dipping and removing processes were repeated three times. The composite tube was dried in an oven for between about 5 and about 10 minutes. The tube was then dipped into the prepared slurry containing about 90 percent by weight of LSCF and about 10 percent by weight of CGO. After soaking for a few seconds, the tube was carefully withdrawn from the solution and allowed to dry in an oven for between about 5 and about 10 minutes. The dried tube was then loaded into a furnace and heated at a rate of about 1° C. per minute in ambient air to about 450° C. for about 1 hour to remove the organic binder in the coating. The heating ramp was increased to about 2° C. per minute to about 1000° C. for about 1 hour to sinter the coating. The furnace was cooled to room temperature at the rate of about 2° C. per minute. The nano cathode functional layer prepared this way was found to be porous with a porosity of from between about 30 and about 40 percent and had a thickness of about 50 microns.

Over fifty such electrolytic cells were formed in the manner outlined above. The resultant electrolytic cell was then evaluated for ASR at a current density of about 1 A./cm$^2$. At about 750° C., an ASR of about 0.25 ohm-cm$^2$ was obtained. The manufacture yields for producing non-shorting electrolytic cell based on room temperature resistance evaluation remained up to 100%.

While the present invention has been described with reference to preferred embodiments, it will occur to those skilled in the art, numerous changes, additions, and omissions may be made without departing from the spirit and scope of the present invention.

We claim:

1. A method of making an electrolytic cell comprising:
    coating an electrolyte layer of an intermediate sintered form comprising said electrolyte layer supported by an anode layer with a pre-coat layer containing electrically non-conductive particles of less than about one-tenth of a micron in size to fill in defects existing within the electrolyte layer;
    removing the pre-coat layer so that the electrically non-conductive particles remain within the defects of the electrolyte layer;
    applying at least a cathode layer to the electrolyte layer with the electrically non-conductive particles in place within the defects; and
    firing the intermediate sintered form with the at least the cathode layer applied to produce the electrolytic cell.

2. The method of claim 1, wherein the cathode layer comprises electrically conductive particles of less than about one-tenth of a micron in size.

3. The method of claim 1, wherein:
    the pre-coat layer is applied by dip coating the intermediate sintered form with a slurry containing the electrically non-conductive particles suspended within a solvent; and
    the pre-coat layer is removed by wiping off the pre-coat layer when wet.

4. The method of claim 3, wherein the concentration of the electrically non-conductive particles within the slurry is no greater than about 60 percent by weight.

5. The method of claim 4, wherein the concentration of the electrically non-conductive parties is in a range of between about 20 percent and about 60 percent by weight.

6. The method of claim 3, wherein the solvent is selected from the group consisting of water, alcohol, isopropanol and toluene.

7. The method of claim 4 or claim 5 or claim 6, wherein the electrically non-conductive particles are formed from an ionic conducting material making up the electrolyte layer.

8. The method of claim 2, wherein the electrically conductive particles are of single phase and are formed from a metal or metal alloy.

9. The method of claim 2, wherein:
    the cathode layer further has ionic conducting particles in a two-phase mixture with the electronically conductive particles; and
    the electronically conductive particles are formed from a metal or metal alloy and the ionic conducting particles present in the two-phase mixture in an amount that is less than about 50 percent by weight.

10. The method of claim 2, wherein:
    the cathode layer further has ionic conducting particles and mixed conducting particles in a three-phase mixture with the electrically conductive particles;
    the electronically conductive particles formed from a metal or metal alloy; and
    the electronically conductive particles, the ionic conducting particles and the mixed conducting particles are present within the mixture in ranges of between about 5 percent and about 50 percent by volume, and between about 5 percent and about 45 percent by volume and between about 5 percent and about 90 percent by volume, respectively.

11. The method of claim 8 or claim 9 or claim 10, wherein the electronically conductive particles are formed from silver, lead, platinum, palladium or silver.

* * * * *